(12) United States Patent
Gregory

(10) Patent No.: US 7,168,646 B2
(45) Date of Patent: Jan. 30, 2007

(54) TRAPEZOIDAL COIL FOR FIBER OPTIC GYROSCOPES

(75) Inventor: Peter Gregory, North Attleboro, MA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/876,327

(22) Filed: Jun. 24, 2004

(65) Prior Publication Data

US 2004/0227032 A1 Nov. 18, 2004

(51) Int. Cl.
*B65H 75/14* (2006.01)

(52) U.S. Cl. .............................. 242/118.32; 242/118.7

(58) Field of Classification Search ........... 242/118.32, 242/118.7, 118
See application file for complete search history.

(56) References Cited

U.S. PATENT DOCUMENTS

| | | | | |
|---|---|---|---|---|
| 4,182,500 A | * | 1/1980 | Schlicker | 242/118.7 |
| 4,369,389 A | * | 1/1983 | Lambrecht | 310/214 |
| 4,471,920 A | * | 9/1984 | Ditton et al. | 242/118.61 |
| 4,995,698 A | * | 2/1991 | Myers | 385/147 |
| 5,181,270 A | * | 1/1993 | Hsu et al. | 385/134 |
| 5,205,510 A | * | 4/1993 | Schotter | 242/159 |
| 5,211,789 A | * | 5/1993 | Christian et al. | 156/169 |
| 5,245,687 A | * | 9/1993 | Usui | 385/134 |
| 5,492,281 A | * | 2/1996 | Blaszyk et al. | 242/159 |
| 2002/0179760 A1 | * | 12/2002 | Gregory | 242/118.4 |

* cited by examiner

*Primary Examiner*—Kathy Matecki
*Assistant Examiner*—Evan Langdon
(74) *Attorney, Agent, or Firm*—Carmen B. Patti & Assoc., LLC

(57) ABSTRACT

A trapezoidal bobbin for providing a foundation for a coil of optical fiber comprises an elongated hub, an upper flange and a lower flange. The elongated hub includes a longitudinal axis, a first end, a second end and an exterior surface. The hub is symmetrically disposed about the longitudinal axis. The upper flange is disposed at the first end of the hub, and includes an exterior surface that is substantially perpendicular to the longitudinal axis and faces away from the hub. The upper flange is further includes an interior surface that forms an angle of substantially 60 degrees with respect to the longitudinal axis. The lower flange is disposed at the second end of the hub, and includes an exterior surface that is substantially perpendicular to the longitudinal axis and facing away from the hub, and an interior surface forming an angle of substantially 60 degrees with respect to the longitudinal axis.

19 Claims, 7 Drawing Sheets

US 7,168,646 B2

TRAPEZOIDAL COIL FOR FIBER OPTIC GYROSCOPES

CROSS-REFERENCE TO RELATED APPLICATIONS

This application claims the benefit of U.S. Provisional Application No. 60/290,042 entitled "TRAPEZOIDAL COIL FOR FIBER OPTIC GYROSCOPES" filed on May 11, 2001, the disclosure of which is entirely incorporated herein by reference; and U.S. patent application Ser. No. 10/142,686 filed on May 10, 2002.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to fiber optic gyroscopes (hereinafter referred to as "FOG"), and more particularly, to structures that support and stabilize the coils of optical fiber within a FOG.

A FOG is used to measure the rate of rotation of a vehicle or other host platform to which the FOG is attached. The FOG typically includes a coil of optical fiber that is wound about a bobbin. The coil, along with the bobbin foundation, can rotate about an axis of rotation. A light source transmits light into each end of the optical fiber, so that two light transmissions propagate through the optical fiber in counter rotating directions. Detection circuitry, typically residing within an Integrated Optical Circuit (hereinafter "IOC"), receives the light transmissions as they emerge from the ends of the optical fiber and measures the relative phase relationship of the light. The phase relationship of the two light transmissions is related to the angular rotation of the FOG coil about the axis of rotation, and may be used to derive an output that is indicative of the rate of rotation of the FOG coil.

FIG. 1A shows a perspective view of a typical prior art bobbin, and FIG. 1B shows the prior art bobbin of FIG. 1A in cross-section view. The bobbin 10 is cylindrically shaped and has an upper flange 12 and a lower flange 14 disposed on opposite ends of the bobbin. The bobbin 10 further includes a principal axis AX, that is perpendicular to the planes formed by the outer surface of the upper flange 12 and the outer surface of the lower flange 14. The principal axis AX is an axis of rotation about which the bobbin and optical coil assembly rotate. The upper and lower flanges are typically characterized by constant thickness, and fabricated as thin as practical, to maximize the volume available for optical fiber.

To stabilize the optical fiber on the bobbin so that the FOG can operate in high vibration environments, the optical fiber is often wound onto the hub with an epoxy adhesive between the hub and the first layer, and also between subsequent layers of optical fiber. Once the optical fiber is completely wound onto the bobbin, the coil assembly is placed in an elevated temperature to cure the epoxy. Because the optical fiber restrains expansion of the coil in the radial direction, the thermal expansion of the coil is greater in the axial direction than in the radial direction. Large thermal induced stresses are therefore produced in the bobbin material and fiber pack when the bobbin is exposed to a temperature different from the epoxy curing temperature, which is the minimum stress temperature of the coil. The effect of changing the temperature of the coil is best illustrated by a finite element model in FIG. 2, which shows the predicted stresses generated in a bobbin manufactured to a prior art. In this example, the zero stress temperature is +85 degrees Celsius and the stresses are calculated at the lowest operating temperature of the coil −54 degrees Celsius. Due to the relatively large thermal expansion of the epoxy, at temperatures below the zero stress temperature, the bobbin flanges are placed in bending, generating large stresses in the flange at the interface with the hub.

A disadvantage with the prior art bobbin configuration shown in FIG. 1A is that the flanges 12, 14, extend from the bobbin 10 without supplemental structural support. Further, since the prior art flanges 10, 12 are typically relatively thin to maximize the volume available for the optical fiber, these flanges have deformed and cracked as a result of thermal induced stresses. Further, the thin prior art flanges are typically characterized by natural modes of vibration at relatively low frequencies. These low frequency modes of vibration result in susceptibility to the shock and vibration environments the host platform experiences.

To meet performance requirements over temperature, the optical fiber coil used in fiber optic gyroscopes is often wound in a quadrupolar pattern. For optimum thermal compensation, the total number of layers is a multiple of four. Although other winding patterns may be used, the winding process typically involves the winding of a predetermined length of optical fiber equally onto a first feed spool and a second feed spool, so that the midpoint of the optical fiber occurs between the two feed spools. Winding commences at the midpoint of the fiber and the first layer is wound using the first feed spool. For the quadrupolar pattern, the second layer and the third layer are wound using the second feed spool, and the fourth layer is wound from the first feed spool. This four-layer pattern is repeated until the requisite number of layers has been wound onto the coil. Adaptations of this winding process involve methods in which the fiber transition occurs between two non-adjacent layers, for example between the first layer and the fourth layer. Another disadvantage with the prior art bobbin configuration stems from the fact that the flanges 12, 14 extend perpendicularly from the bobbin 10. Some automated coil winding systems require the bobbin to have a slot in each flange that extends in a radial direction from the principal axis to the outer edge of the flange. These slots are both costly to machine and significantly reduce the stiffness and hence stability of the bobbin. A guide wheel carries the fiber from the feed spool to the bobbin. To ensure precise placement of the fiber and to minimize fiber crossovers, the guide wheel must be situated close to the fiber layer being wound. With bobbins of the previous art (having parallel flanges as shown in FIG. 1A) the fiber from the idle, non-winding feed spool must temporarily exit the slot to prevent interference with the guide wheel. The fiber from the idle feed spool is thus "parked" in a position outside the flange until that feed spool is required for winding, at which time the feed spools change places, and the previously-active feed spool is parked while the previously-idle spool winds its fiber onto the bobbin. This process continues, with the feed spools alternating, until the fiber coil is completed.

SUMMARY OF THE INVENTION

In one aspect, a trapezoidal bobbin for providing foundation for a coil of optical fiber comprises an elongated hub, an upper flange and a lower flange. The elongated hub includes a longitudinal axis, a first end, a second end and an exterior surface. In one embodiment, the hub is cylindrical, although other elongated shapes may also be used. The hub is symmetrically disposed about the longitudinal axis. The upper flange is disposed at the first end of the hub, and includes an exterior surface that is substantially perpendicular to the longitudinal axis and faces away from the hub. The upper flange is further includes an interior surface that forms an angle of substantially 60 degrees with respect to the longitudinal axis. The lower flange is disposed at the second end of the hub, and includes an exterior surface that is substantially perpendicular to the longitudinal axis and facing away from the hub, and an interior surface forming an angle of substantially 60 degrees with respect to the longitudinal axis.

In another embodiment, the upper flange and the lower flange are fixedly attached to the cylindrical hub.

In another embodiment, the cylindrical hub, the upper flange and the lower flange form a unitary component.

In another embodiment, the unitary component includes a substantially homogenous material.

In another embodiment, the upper flange is symmetrically disposed about the longitudinal axis.

In another embodiment, the lower flange is symmetrically disposed about the longitudinal axis.

In another embodiment, the length of the exterior surface of the hub, measured from the interior surface of the upper flange to the interior surface of the lower flange, is substantially equal to an integral number of diameters of an optical fiber. Thus, an integer number of turns of that optical fiber will fit at the first layer, directly against the hub.

In another embodiment, the composition of the hub, the upper flange and the lower flange includes a substance having a thermal expansion characteristic similar to an optical fiber to be wound on the trapezoidal bobbin. In one embodiment, the substance includes plastic. In another embodiment, the substance includes a composite material.

In another aspect, a trapezoidal optical fiber coil use in a fiber optic gyroscope comprises a bobbin and a predetermined length of optical fiber wound about the bobbin in succeeding layers. The bobbin includes a cylindrical hub characterized by a longitudinal axis, a first end, a second end and an exterior surface, the hub being symmetrically disposed about the longitudinal axis. The bobbin also includes an upper flange symmetrically disposed about the longitudinal axis at the first end of the hub. The upper flange is characterized by an exterior surface that is substantially perpendicular to the longitudinal axis and faces away from the hub. The upper flange is further characterized by an interior surface that forms an angle of substantially 60 degrees with respect to the longitudinal axis. The bobbin further includes a lower flange symmetrically disposed about the longitudinal axis at the second end of the hub. The lower flange is characterized by an exterior surface that is substantially perpendicular to the longitudinal axis and faces away from the hub. The lower flange is further characterized by an interior surface that forms an angle of substantially 60 degrees with respect to the longitudinal axis. A predetermined length of optical fiber is wound about the bobbin in succeeding layers extending from the longitudinal axis in a radial direction. The first layer is disposed upon the exterior surface of the hub in an integer number of turns of the optical fiber, and each subsequent layer having an integer number of turns greater than the next preceding layer.

In another embodiment, the upper flange and the lower flange are fixedly attached to the cylindrical hub.

In another embodiment, the cylindrical hub, the upper flange and the lower flange form a unitary component.

In another embodiment, the unitary component includes a substantially homogenous material.

In another embodiment, the upper flange is symmetrically disposed about the longitudinal axis.

In another embodiment, the lower flange is symmetrically disposed about the longitudinal axis.

In another embodiment, a length of the exterior surface of the hub, measured from the interior surface of the upper flange to the interior surface of the lower flange, is substantially equal to an integral number of diameters of an optical fiber.

In another embodiment, the composition of the hub, the upper flange and the lower flange includes a substance having a thermal expansion characteristic similar to an optical fiber to be wound on the trapezoidal bobbin.

In another embodiment, the substance includes plastic.

In another embodiment, the substance includes a composite material.

In another embodiment, the optical fiber, viewed in a plane intersecting the longitudinal axis, is arranged in a quadrupolar pattern.

Another embodiment further includes a layer of epoxy disposed between the first layer of optical fiber and the exterior surface of the hub.

Another embodiment further includes a layer of epoxy disposed between each adjacent layer of optical fiber.

In another aspect, a trapezoidal bobbin for providing a foundation about which an optical fiber is wound comprises hub means, upper flange means and lower flange means. The hub means provides an elongated form for winding optical fiber, and includes a longitudinal axis, a first end, a second end and an exterior surface. The hub is symmetrically disposed about the longitudinal axis. The upper flange means terminates the first end of the hub, and includes an exterior surface that is substantially perpendicular to the longitudinal axis, and faces away from the hub. The upper flange also includes an interior surface that forms an angle of substantially 60 degrees with respect to the longitudinal axis. The lower flange means terminates the second end of the hub, and includes an exterior surface that is substantially perpendicular to the longitudinal axis and faces away from the hub. The lower flange also includes an interior surface forming an angle of substantially 60 degrees with respect to the longitudinal axis.

In another aspect, a method of winding a optical fiber about a trapezoidal bobbin comprises winding, with a first feed spool and a second feed spool, the optical fiber about the cylindrical hub of the bobbin. The cylindrical hub includes a longitudinal axis, a first end, a second end and an exterior surface. The hub is symmetrically disposed about the longitudinal axis. The bobbin also includes an upper flange that is symmetrically disposed about the longitudinal axis at the first end of the hub. The upper flange includes an exterior surface that is substantially perpendicular to the longitudinal axis and facing away from the hub. The upper flange also includes an interior surface that forms an angle of substantially 60 degrees with respect to the longitudinal axis. The bobbin also includes a lower flange symmetrically disposed about the longitudinal axis at the second end of the hub. The lower flange is characterized by an exterior surface that is substantially perpendicular to the longitudinal axis and facing away from the hub, and an interior surface forming an angle of substantially 60 degrees with respect to the longitudinal axis. The method includes winding, via the first feed spool, a first layer of optical fiber about the hub from the upper flange to the lower flange, such that the first layer includes a first integer number of turns of the optical fiber. The method further includes moving the first feed spool in a direction parallel to the longitudinal axis to a location away from the first layer of optical fiber. The method further includes winding, via the second feed spool, a second layer of optical fiber about the hub overlaying the first layer of optical fiber, from the upper flange to the lower flange. The second layer is wound so as to include an integer number of turns that is equal to one more than the first integer number of turns. The method also include winding, via the second feed spool, a third layer of optical fiber about the hub on top of the second layer of optical fiber, from the lower flange to the upper flange. The second layer is wound so as to include a third integer number of turns that is equal to one more than the second integer number of turns. The method further includes moving the second feed spool in a direction parallel to the longitudinal axis, to a location away from the third layer of optical fiber. The method also includes winding, via the first feed spool, a fourth layer of optical fiber about the hub on top of the third layer of optical fiber, from the lower flange to the upper flange. The fourth layer includes a fourth integer number of turns that is equal to one more than the third integer number of turns.

Another embodiment of the invention further includes repeating, after winding the fourth layer of optical fiber, the winding of the first, second, third and fourth layers, so as to apply at least two sets of four layers on the trapezoidal bobbin.

Another embodiment of the invention further includes arranging the layers of optical fiber so as to create a quadrupolar pattern when the layers are viewed in a plane intersecting the longitudinal axis.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 3:
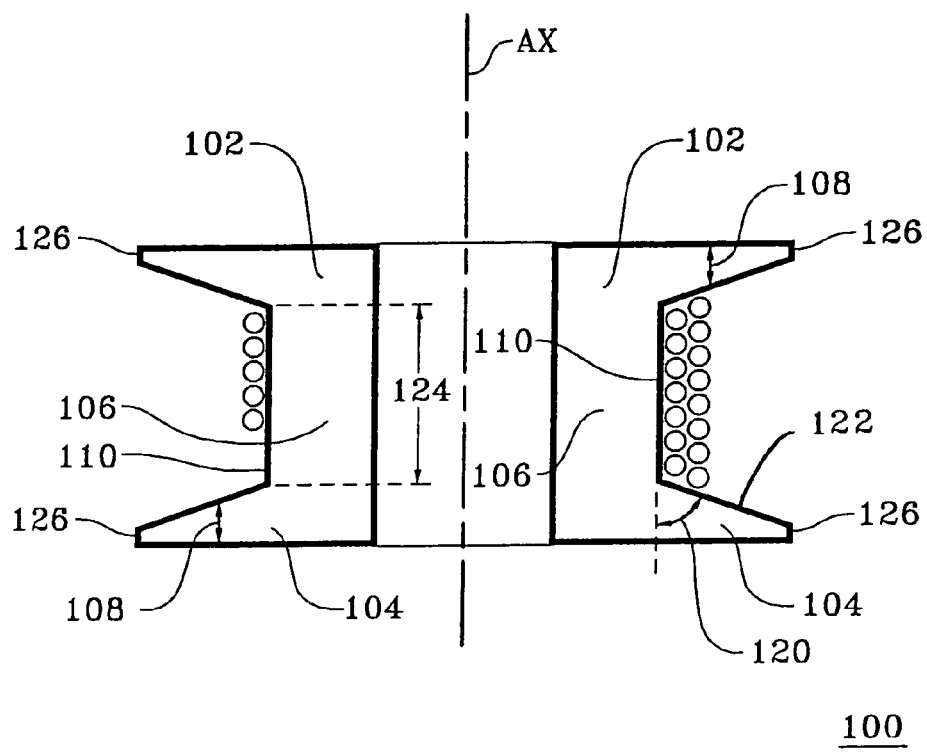
FIG. 3 illustrates one embodiment of a trapezoidal bobbin for providing a foundation for an optical fiber coil; and, FIG. 4 shows a stress profile from a finite element model of the trapezoidal bobbin of FIG. 3.

FIG. 3 illustrates one embodiment of a trapezoidal bobbin 100, including an upper flange 102 and a lower flange 104 disposed at either end of a cylindrical hub 106. In some embodiments, the hub 106 and flanges 102 and 104 are separate components and the flanges 102 and 104 are fixedly attached to the hub 106. In other embodiments, the hub 106 and flanges 102 and 104 form a unitary component, i.e., the hub and flanges are formed as a single component, without any type of interface or boundary where the hub 106 ends and the flange (102 or 104) begins. In some embodiments, the unitary component is made of a material that is homogenous or nearly homogeneous, i.e., the material properties are the same or nearly the same throughout the component. In one embodiment, the trapezoidal bobbin 100 is made of plastic. In other embodiments, the trapezoidal bobbin 100 is made of a composite material. In general, the trapezoidal bobbin is made of a material that has a thermal expansion characteristic similar to that of the optical fiber that is to be wound on it. The upper flange 102, lower flange 104 and hub 106 are symmetrically disposed about a central axis AX. The longitudinal dimension 108 of the upper flange 102 and the lower flange 106 (i.e., the dimension along a line parallel to the axis AX) decreases with the radial distance from the axis AX. Each flange is thus thickest (i.e., the longitudinal dimension 108 is greatest) at the exterior surface 110 of the cylindrical hub 106, and thinnest (i.e., the longitudinal dimension 108 is smallest) at the point farthest from the axis AX. In one embodiment, the longitudinal dimension is non-zero at the point farthest from the axis, so that the outer edge 126 of the flange is blunt rather than pointed. In other embodiments, the longitudinal dimension 108 is zero or near-zero at the point farthest from the axis, so that the outer edge 126 of the flange is pointed.

The first (base) layer of optical fiber is wound upon exterior surface 110 of the cylindrical hub 106. In one embodiment of the bobbin 100, the angle 120 between the hub 106 and the interior flange surface 122 is exactly 60 degrees. In other embodiments, the angle 120 is only approximately 60 degrees. For example, the angle may be optimally 60 degrees with some allowable angle error, such as +/−5 degrees, although other angle error margins may also be used. In yet other embodiments, the angle 120 between the hub and the interior flange surface 120 another angle suitable to the particular winding pattern used to apply the optical fiber to the bobbin. Further, the length 124 of the exterior surface 110, measured from the upper flange 102 to the lower flange 104, is such that the first layer of optical fiber is characterized by an integer number of fiber turns. Because of the 60 degree angle between the hub 106 and the interior flange surface 122, the second layer of optical fiber has one additional turn with respect to the first layer, the third layer of optical fiber has two additional turn with respect to the first layer, etc. In general, the $N^{th}$ layer of optical fiber has N−1 additional turns with respect to the first (base) layer. The completed fiber coil is therefore trapezoidal in cross section, as is shown in FIG. 3.

One advantage of the trapezoidal bobbin 100 shown in FIG. 3 is increased stability, due to the thickness of the flanges 102 and 104, with respect to the flanges of the prior art. The greater thickness of the flanges 102 and 104 in the longitudinal dimension 108 (with respect to the prior art) increases the frequencies of the natural modes of vibration of the bobbin 100, resulting in an extremely stable coil in high shock and vibration environments.

Figure 1A:
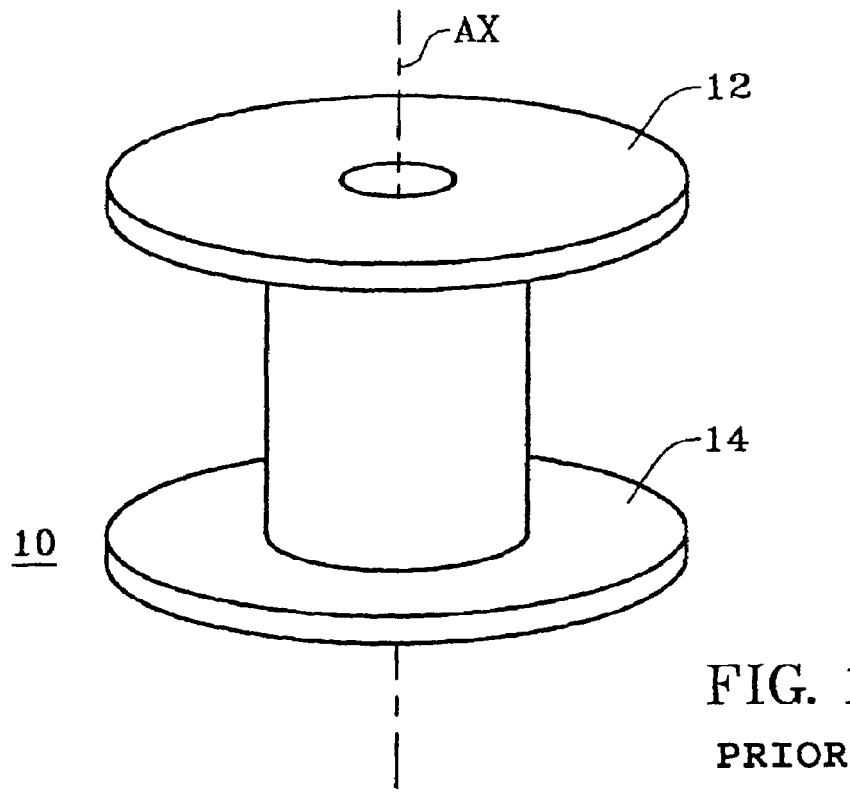
FIG. 1A shows a perspective view of a typical prior art bobbin.
Figure 1B:
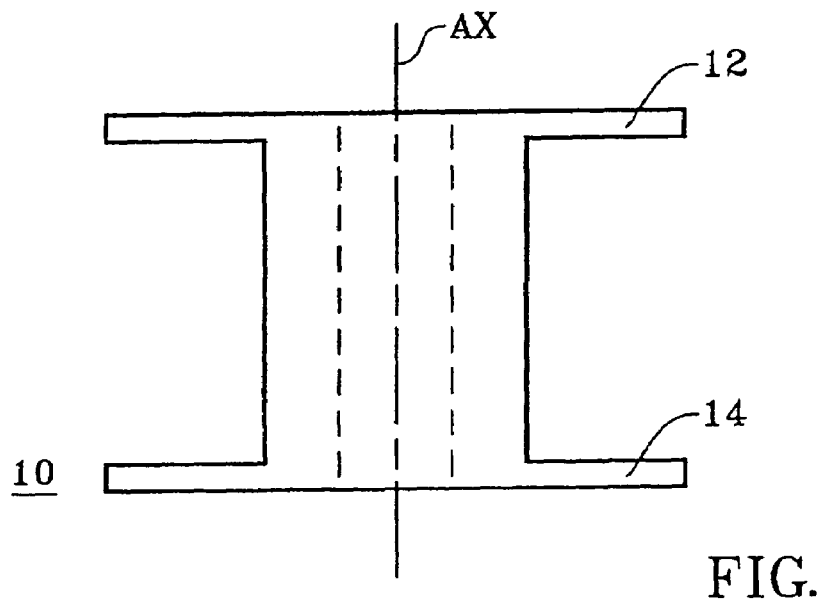
FIG. 1B shows a cross-sectional view of the prior art bobbin of FIG. 1A.
Figure 2:
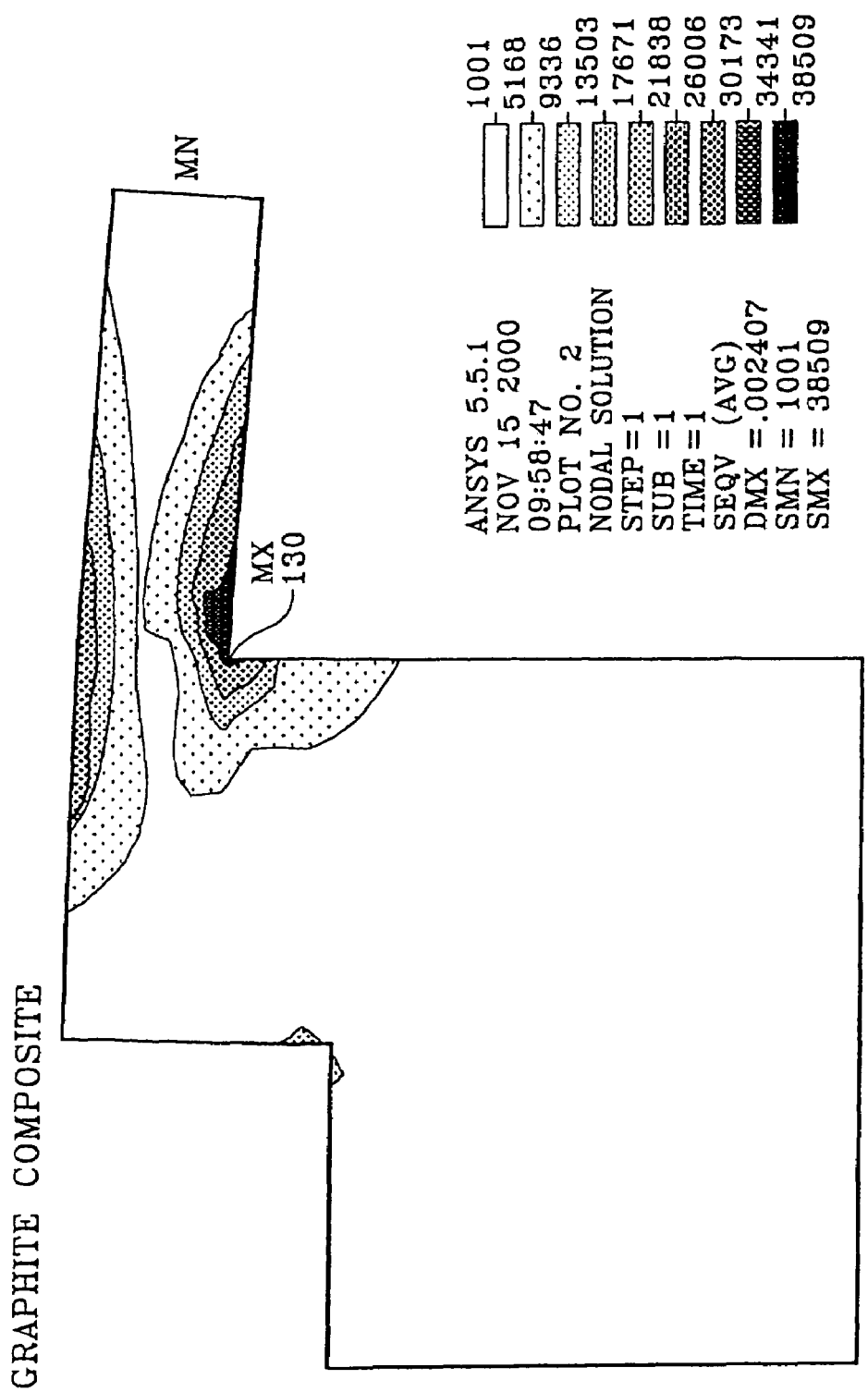
FIG. 2 shows a stress profile from a finite element model of the prior art bobbin of FIG. 1A.
Figure 4:
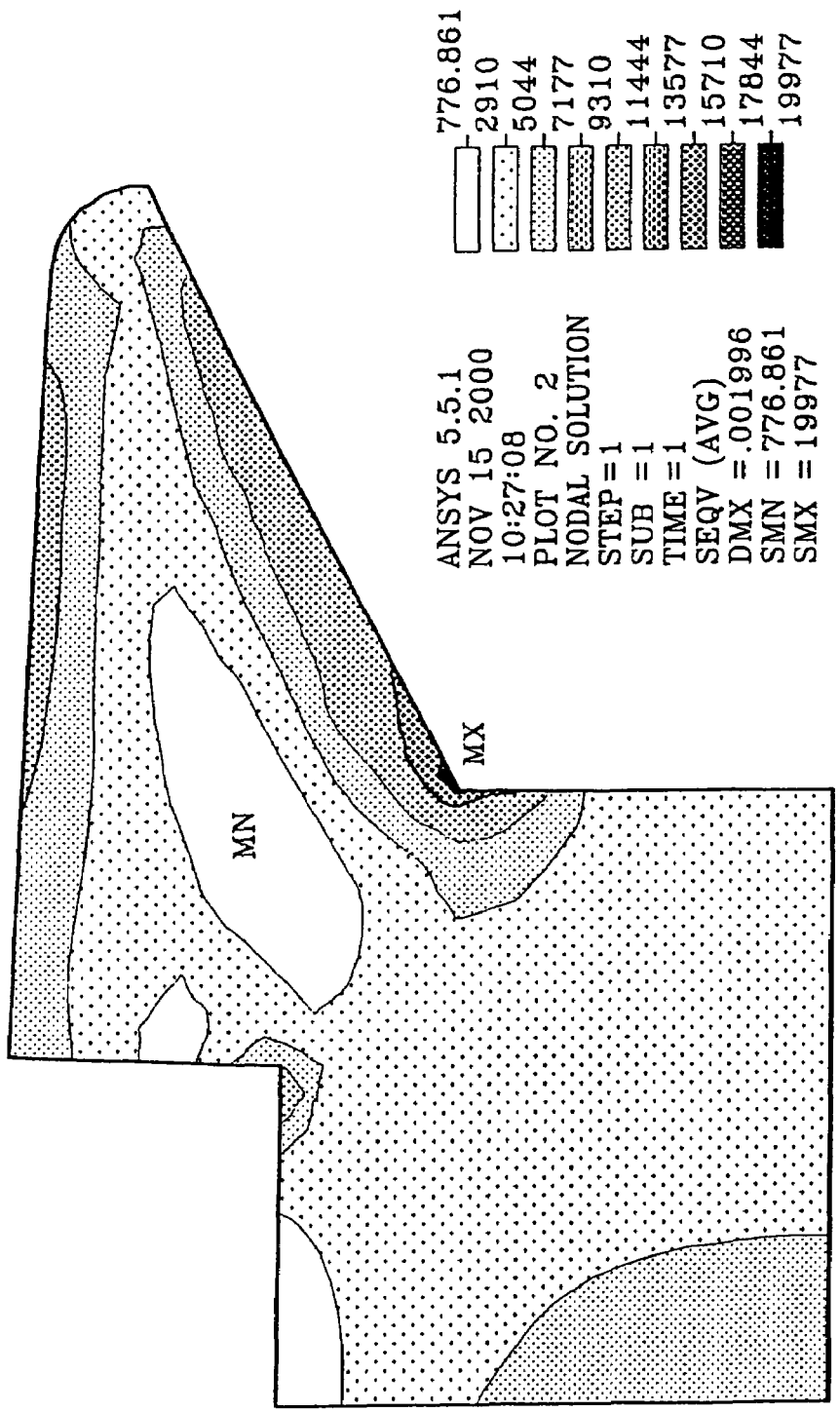

Another advantage of the trapezoidal bobbin 100 is a significant reduction in the thermally induced stresses within the bobbin 100, and consequently also in the optical fiber coil that is wound on the bobbin 100. This advantage may be observed by comparing the temperature-induced stresses in a prior art bobbin assembly (see FIG. 2), to the results of a finite element model representing an embodiment of a trapezoidal bobbin 100 (see FIG. 4). As was described herein, the optical fiber is typically wound onto the hub 106 with an epoxy adhesive so that the FOG can operate in high vibration environments. FIG. 2 plots the predicted stresses generated in a prior art bobbin, for which the zero stress temperature is +85 degrees Celsius and the stresses are calculated at the lowest operating temperature of the coil (−54 degrees Celsius). Due to the relatively large thermal expansion of the epoxy adhesive at temperatures below the zero stress temperature, the bobbin flanges are subjected to bending forces, generating large stresses in the flange at, and in regions near, the hub interface 130. Comparing FIG. 2 to FIG. 4, bobbins with the trapezoidal flange of FIG. 4 demonstrate at least a factor of two reduction in stress, relative to the prior art bobbin of FIG. 2. Consequently, the resultant stress on the optical fiber with the trapezoidal bobbin is generally lower than with a prior art bobbin.

The trapezoidal bobbin offers further advantages over the prior art in the process of winding the optical fiber onto the bobbin. As described in more detail herein, the optical fiber coil used in fiber optic gyroscopes is often wound in a quadrupolar pattern. Because the optical coil on the trapezoidal bobbin 100 increments by exactly one turn per layer (described herein), the optical fiber wound on the trapezoidal bobbin 100 can "climb" up the interior flange surface 122 without interfering with intermediate layers from the alternate feed spool.

Figure 5:
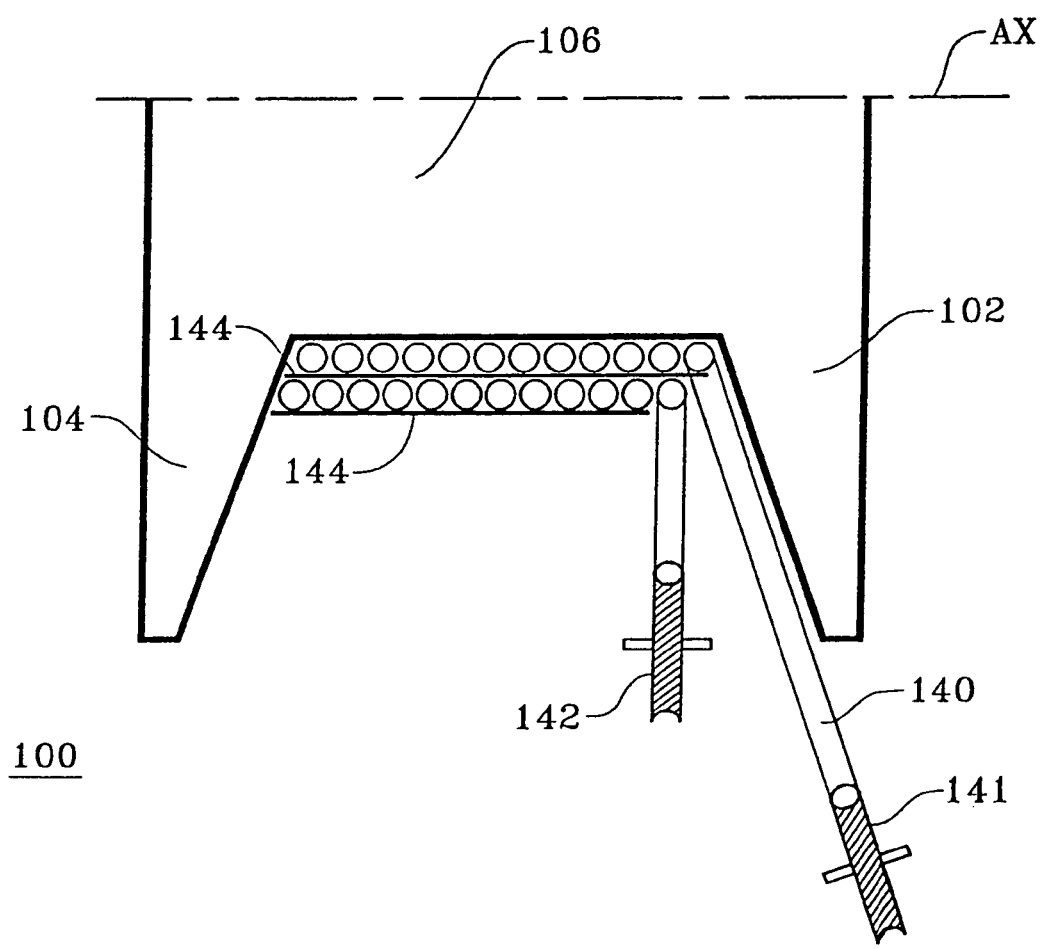
FIG. 5 shows the optical fiber being wound onto the trapezoidal bobbin of FIG. 3.
Figure 6:
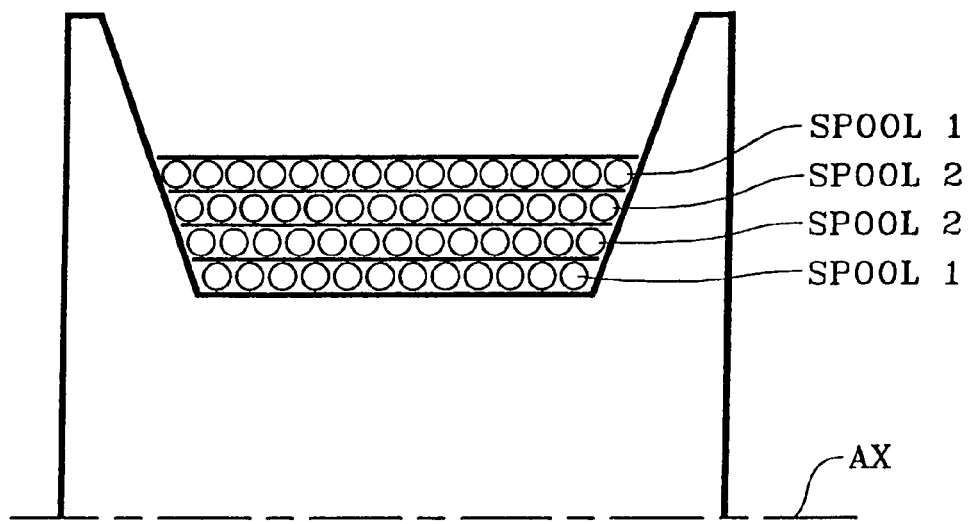
FIG. 6 shows the first four layers of the optical fiber on the trapezoidal bobbin of FIG. 3; and, FIG. 7 shows the trapezoidal bobbin of FIG. 3 after winding of the optical fiber has been completed.
Figure 7:
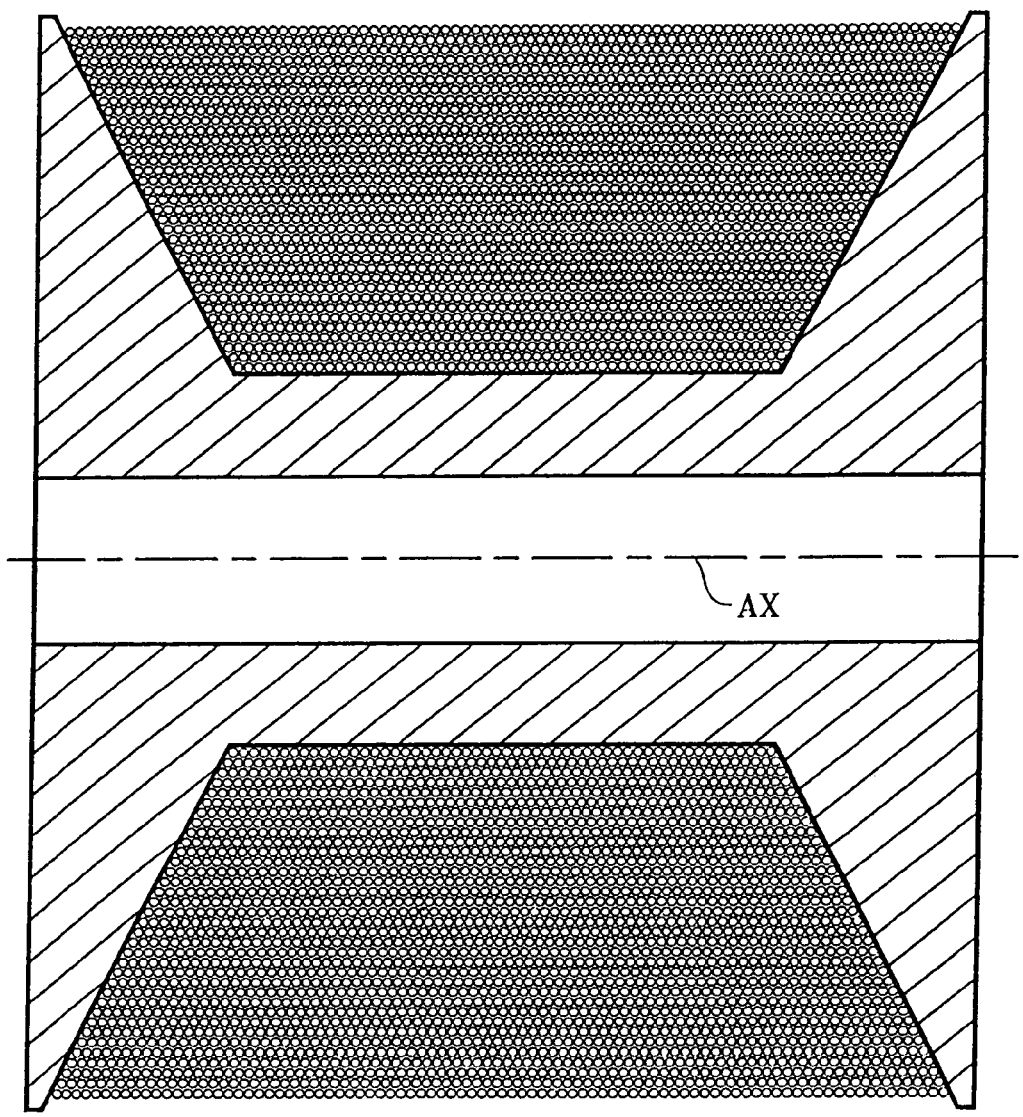

Yet another advantage of the trapezoidal bobbin 100 is that no slot is required in the flange to allow the fiber from the non-winding feed spool to exit the active winding area, as was described herein for the prior art bobbins. Because the trapezoidal bobbin has flanges that are angled with respect to a plane perpendicular to the hub, the end of the fiber that is not being wound (i.e., the inactive end) is simply moved over, away from the active winding area, to prevent interference with the active guide wheel. This advantage is illustrated in FIG. 5. The idle fiber 140 from the idle feed spool is shown off to one side while the active guide wheel 142 applies the active fiber from the active feed spool to the bobbin. The lack of slots for allowing the fiber from the feed spools to exit the winding area allows the flanges to maintain their structural integrity and thus their mechanical stability. FIG. 6 shows the first four layers of optical fiber on the trapezoidal bobbin, illustrating that the first feed spool applies the first layer, the second feed spool applies the second and the third layers, and the first feed spool applies the fourth layer, as was described herein in general for prior art bobbins. The first and second feed spools apply additional sets of four layers onto the trapezoidal bobbin using the same first-second-second-first application pattern.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A trapezoidal bobbin and a coil of optical fiber wound about the trapezoidal bobbin, the optical fiber having a predetermined diameter, the trapezoidal bobbin comprising:

an elongated hub including a longitudinal axis, a first end, a second end and an exterior surface, the hub being symmetrically disposed about the longitudinal axis;

an upper flange disposed at the first end of the hub, the upper flange including an exterior surface being substantially perpendicular to the longitudinal axis and facing away from the hub, and an interior surface forming an angle of substantially 60 degrees with respect to the longitudinal axis;

a lower flange disposed at the second end of the hub, the lower flange including an exterior surface being substantially perpendicular to the longitudinal axis and facing away from the hub, and an interior surface forming an angle of substantially 60 degrees with respect to the longitudinal axis;

a length of the exterior surface of the hub, measured from the interior surface of the upper flange to the interior surface of the lower flange, being substantially equal to an integral number of diameters of the optical fiber; and the angles of the interior surfaces of the upper and lower flanges being such that, for a plurality of layers of optical fiber wound on the bobbin, each layer of the plurality of layers of optical fiber is substantially equal to a length of an integral number of diameters of the optical fiber, and each layer of the plurality of layers of optical fiber increasing in number of fiber turns with increasing distance from the hub;

wherein the trapezoidal bobbin is adapted to be wound with optical fiber about the hub from a first feed spool and a second feed spool by:

the first feed spool adapted to wind a first layer of optical fiber about the hub from the upper flange to the lower flange, such that the first layer includes a first integer number of turns of the optical fiber;

the first feed spool adapted to move in a direction parallel to the longitudinal axis to a location away from the first layer of optical fiber;

the second feed spool adapted to wind a second layer of optical fiber about the hub overlaying the first layer of optical fiber, from the upper flange to the lower flange, such that the second layer is wound so as to include an integer number of turns that is equal to one more than the first integer number of turns;

the second feed spool adapted to wind a third layer of optical fiber about the hub on top of the second layer of optical fiber, from the lower flange to the upper flange, such that the third layer is wound so as to include a third integer number of turns that is equal to one more than the second integer number of turns;

the second feed spool adapted to move in a direction parallel to the longitudinal axis to a location away from the third layer of optical fiber;

the first feed spool adapted to wind a fourth layer of optical fiber about the hub on top of the third layer of optical fiber, from the lower flange to the upper flange, such that the fourth layer is wound so as to include a fourth integer number of turns that is equal to one more than the third integer number of turns;

wherein said winding is facilitated by an active guide wheel positioned proximate an active winding area defined by said upper and lower flanges, and wherein the angles of the interior surfaces of the upper and lower flanges allow fiber from a non-winding spool to be moved over, away from the active winding area, to prevent interference with the active guide wheel, without requiring that slots be provided in said upper and lower flanges; and wherein the trapezoidal bobbin is adapted to wind at least two sets of four layers on the trapezoidal bobbin.

2. The trapezoidal bobbin and the coil of optical fiber of claim 1, wherein the unitary component includes a substantially homogenous material.

3. The trapezoidal bobbin and the coil of optical fiber of claim 1, wherein the upper flange and lower flanges are symmetrically disposed about the longitudinal axis.

4. The trapezoidal bobbin and the coil of optical fiber of claim 1, wherein the composition of the hub, the upper flange and the lower flange includes a substance having a thermal expansion characteristic similar to the optical fiber.

5. The trapezoidal bobbin and the coil of optical fiber of claim 4, wherein the substance includes plastic.

6. The trapezoidal bobbin and the coil of optical fiber of claim 4, wherein the substance includes a composite material.

7. A trapezoidal bobbin and a coil of optical fiber wound about the trapezoidal bobbin, the optical fiber having a predetermined diameter, the trapezoidal bobbin comprising:
an elongated hub including a longitudinal axis, a first end, a second end and an exterior surface, the hub being symmetrically disposed about the longitudinal axis;
an upper flange disposed at the first end of the hub, the upper flange including an exterior surface being substantially perpendicular to the longitudinal axis and facing away from the hub, and an interior surface forming an angle of substantially 60 degrees with respect to the longitudinal axis;
a lower flange disposed at the second end of the hub, the lower flange including an exterior surface being substantially perpendicular to the longitudinal axis and facing away from the hub, and an interior surface forming an angle of substantially 60 degrees with respect to the longitudinal axis;
a length of the exterior surface of the hub, measured from the interior surface of the upper flange to the interior surface of the lower flange, being substantially equal to an integral number M of diameters of the optical fiber, where M is a whole number; and
N layers of optical fibers wound on the bobbin, a first layer of optical fibers having an integer number M of fiber turns, and an Nth layer having N−1+M fiber turns;
wherein the trapezoidal bobbin is adapted to be wound with optical fiber about the hub from a first feed spool and a second feed spool by:
the first feed spool adapted to wind a first layer of optical fiber about the hub from the upper flange to the lower flange, such that the first layer includes a first integer number of turns of the optical fiber;
the first feed spool adapted to move in a direction parallel to the longitudinal axis to a location away from the first layer of optical fiber;
the second feed spool adapted to wind a second layer of optical fiber about the hub overlaying the first layer of optical fiber, from the upper flange to the lower flange, such that the second layer is wound so as to include an integer number of turns that is equal to one more than the first integer number of turns;
the second feed spool adapted to wind a third layer of optical fiber about the hub on top of the second layer of optical fiber, from the lower flange to the upper flange, such that the third layer is wound so as to include a third integer number of turns that is equal to one more than the second integer number of turns;
the second feed spool adapted to move in a direction parallel to the longitudinal axis to a location away from the third layer of optical fiber;
the first feed spool adapted to wind a fourth layer of optical fiber about the hub on top of the third layer of optical fiber, from the lower flange to the upper flange, such that the fourth layer is wound so as to include a fourth integer number of turns that is equal to one more than the third integer number of turns;
wherein said winding is facilitated by an active guide wheel positioned proximate an active winding area defined by said upper and lower flanges, and wherein the angles of the interior surfaces of the upper and lower flanges allow fiber from a non-winding spool to be moved over, away from the active winding area, to prevent interference with the active guide wheel, without requiring that slots be provided in said upper and lower flanges; and
wherein the trapezoidal bobbin is adapted to wind at least two sets of four layers on the trapezoidal bobbin.

8. The trapezoidal bobbin and the coil of optical fiber of claim 7, wherein the coil of optical fiber comprises a quadrupolar arrangement about the trapezoidal bobbin.

9. A trapezoidal optical fiber coil for use in a fiber optic gyroscope, comprising:
a bobbin having a cylindrical hub characterized by a longitudinal axis, a first end, a second end and an exterior surface, the hub being symmetrically disposed about the longitudinal axis;
an upper flange symmetrically disposed about the longitudinal axis at the first end of the hub, the upper flange having by an exterior surface substantially perpendicular to the longitudinal axis and facing away from the hub, and an interior surface forming an angle of approximately 60 degrees with respect to the longitudinal axis;
a lower flange symmetrically disposed about the longitudinal axis at the second end of the hub, the lower flange having by an exterior surface substantially perpendicular to the longitudinal axis and facing away from the hub, and an interior surface forming an angle of approximately 60 degrees with respect to the longitudinal axis; and
a predetermined length of optical fiber wound about the bobbin in succeeding layers extending from the longitudinal axis in a radial direction, the first layer disposed on the exterior surface of the hub in an integer number of turns of the optical fiber, and each subsequent layer having an integer number of turns greater than the next preceding layer;
wherein the trapezoidal bobbin is adapted to be wound with optical fiber about the hub from a first feed spool and a second feed spool by:
the first feed spool adapted to wind a first layer of optical fiber about the hub from the upper flange to the lower flange, such that the first layer includes a first integer number of turns of the optical fiber;
the first feed spool adapted to move in a direction parallel to the longitudinal axis to a location away from the first layer of optical fiber;
the second feed spool adapted to wind a second layer of optical fiber about the hub overlaying the first layer of optical fiber, from the upper flange to the lower flange, such that the second layer is wound so as to include an integer number of turns that is equal to one more than the first integer number of turns;

the second feed spool adapted to wind a third layer of optical fiber about the hub on top of the second layer of optical fiber, from the lower flange to the upper flange, such that the third layer is wound so as to include a third integer number of turns that is equal to one more than the second integer number of turns;

the second feed spool adapted to move in a direction parallel to the longitudinal axis to a location away from the third layer of optical fiber;

the first feed spool adapted to wind a fourth layer of optical fiber about the hub on top of the third layer of optical fiber, from the lower flange to the upper flange, such that the fourth layer is wound so as to include a fourth integer number of turns that is equal to one more than the third integer number of turns;

wherein said winding is facilitated by an active guide wheel positioned proximate an active winding area defined by said upper and lower flanges, and wherein the angles of the interior surfaces of the upper and lower flanges allow fiber from a non-winding spool to be moved over, away from the active winding area, to prevent interference with the active guide wheel, without requiring that slots be provided in said upper and lower flanges; and wherein the trapezoidal bobbin is adapted to wind at least two sets of four layers on the trapezoidal bobbin.

10. The trapezoidal optical fiber coil according to claim 9, wherein the upper flange and the lower flange are fixedly attached to the cylindrical hub.

11. The trapezoidal optical fiber coil according to claim 9, wherein the cylindrical hub, the upper flange and the lower flange form a unitary component.

12. The trapezoidal optical fiber coil according to claim 11, wherein the unitary component includes a substantially homogenous material.

13. The trapezoidal optical fiber coil according to claim 9, wherein the upper flange is symmetrically disposed about the longitudinal axis.

14. The trapezoidal optical fiber coil according to claim 9, wherein the lower flange is symmetrically disposed about the longitudinal axis.

15. The trapezoidal optical fiber coil according to claim 9, wherein a length of the exterior surface of the hub, measured from the interior surface of the upper flange to the interior surface of the lower flange, is substantially equal to an integral number of diameters of an optical fiber.

16. The trapezoidal optical fiber coil according to claim 9, wherein the composition of the hub, the upper flange and the lower flange includes a substance having a thermal expansion characteristic similar to an optical fiber to be wound on the trapezoidal bobbin.

17. The trapezoidal optical fiber coil according to claim 9, wherein the optical fiber, viewed in a plane intersecting the longitudinal axis, is arranged in a quadrupolar pattern.

18. The trapezoidal optical fiber coil according to claim 9, further including a layer of epoxy disposed between the first layer of optical fiber and the exterior surface of the hub.

19. The trapezoidal optical fiber coil according to claim 9, further including a layer of epoxy disposed between each adjacent layer of optical fiber.

* * * * *